S. INGERSOLL.

Improvement in Spring-Scales.

No. 5,082. Reissued Oct. 1, 1872.

Witnesses,

S W Wood

P. V. Lyons

Inventor,

Simeon Ingersoll assignor to

Joseph Holley &

John Rogers by their Atty.,

J. S. Brown.

UNITED STATES PATENT OFFICE.

SIMON INGERSOLL, OF BROOKLYN, NEW YORK, ASSIGNOR, BY MESNE ASSIGNMENTS, TO JOSEPH HOLLELY AND JOHN RYER, OF SAME PLACE.

IMPROVEMENT IN SPRING-SCALES.

Specification forming part of Letters Patent No. 95,588, dated October 5, 1869; reissue No. 5,082, dated October 1, 1872.

*To all whom it may concern:*

Be it known that SIMON INGERSOLL has invented new and useful Improvements in Spring Weighing-Scales; and we, JOSEPH HOLLELY and JOHN RYER, of Brooklyn, in the county of Kings and State of New York, assignees of all right and title in and to the said invention, do hereby declare that the following is a full and exact description thereof, reference being had to the accompanying drawing making part of this specification—

Figure 1:
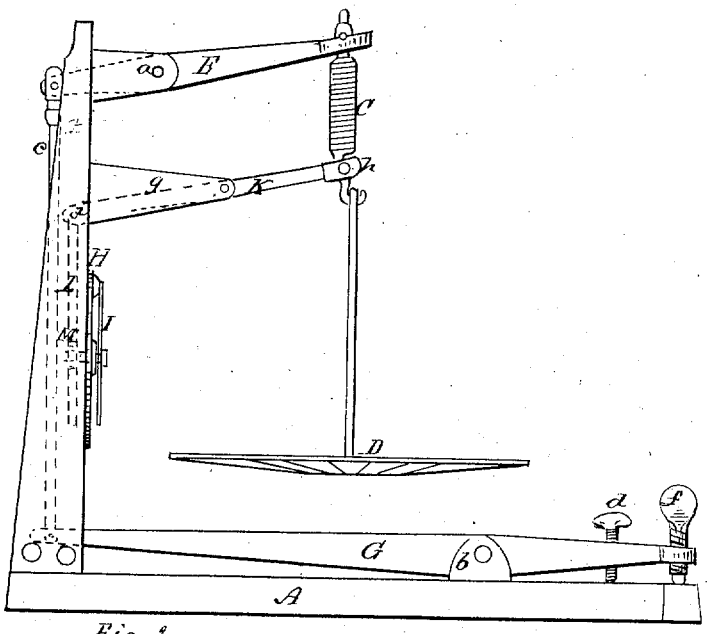
Figure 2:
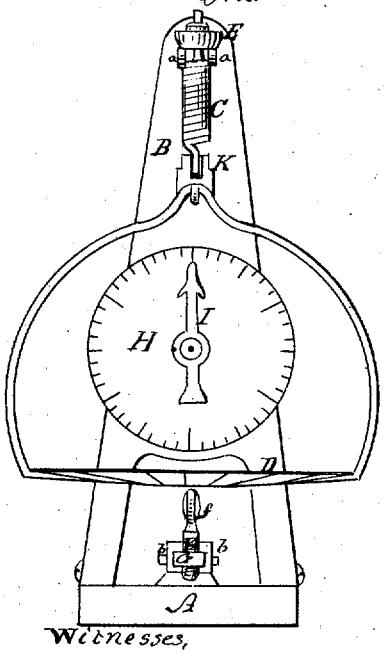
Figure 3:
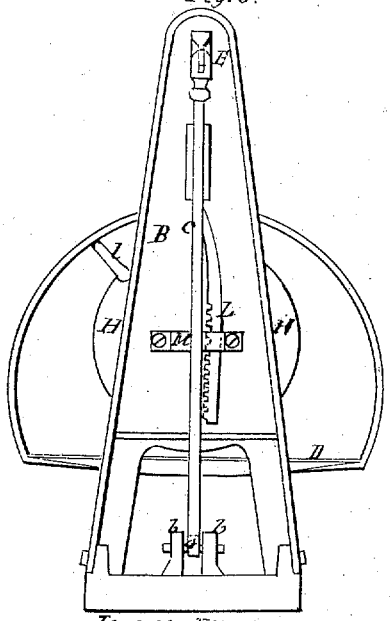

Figure 1 being a side elevation of spring-scales, constructed with the said improvements; Fig. 2, a front elevation of the same; Fig. 3, a rear elevation thereof.

Like letters designate corresponding parts in all of the figures.

The scales in which these improvements are embodied have a supporting-base, A, from one side of which a standard, B, extends upward to sustain the weighing spring and dish at the proper height. In order to support the weighing-spring C in a position where the dish D may be suspended from it free of obstruction an arm, E, projects from the standard, and the spring is suspended from the outer end thereof far enough away from the standard to allow the dish D clear room beneath, while the base A extends forward under the arm E, so as to support the spring and dish and the articles and substances to be weighed therein. The suspending-arm E is made movable vertically, and in order to raise and lower or adjust it conveniently in its movable direction, it is arranged as a lever, being pivoted to projecting bearings *a* of the standard, and the adjusting device is applied to its rear end, behind or in the standard; but, for convenience in raising and lowering or adjusting the said lever arm, the device for effecting the purpose may be arranged on the base A in front of the standard, as represented in the drawing. It consists, as shown, of a lever, G, pivoted to bearings *b* on the base; and this lever is connected with the suspending-arm by a rod, *c*. In the front end of the lever are two screws, *d* and *f*, bearing upon the base; one screw, *d*, being used as a zero-screw, to accurately adjust the spring to zero on the dial, and the other screw, *f*, being employed as a tare-screw, by turning which and raising the suspending-arm E and the weighing-spring C, the index of the dial is quickly moved back to zero after placing a containing vessel in the dish, so that the net weight of the substance weighed may be indicated directly on the dial. After weighing the index is returned to the zero position by reversing the thumb-screw *f*, and thus lowering the spring to its normal position. The lever G may be dispensed with, and the zero and tare screws may be arranged in the standard, so as to effect the suspending-arm directly. The dial H and index I are located on the front side of the standard B; and in order to communicate the movements of the weighing-spring to the index a lever, K, is pivoted to a bearing or bearings, *g*, projecting from the standard, and has its forward end connected with the lower end of the spring by a pivot-pin, *h*, or its equivalent, while its rear end is pivoted at *i* to the rack L, which gears into the pinion M of the index-shaft. This lever thus not only serves to transmit the motion from the spring to the index, but, by having its two arms of unequal length, greater or less movement can be communicated to the index with a given movement of the spring, as may be desired. The dial H is or may be movable around its axis, being provided with a handle, *l*, for the purpose. This is useful for adjusting to double tare, or for weighing two substances successively at the same weighing, as in compounding or mixing.

What we claim as the invention of SIMON INGERSOLL, and desire to secure by Letters Patent, is—

1. In spring weighing-scales or balances, the weighing-spring C, provided with a means of adjusting its fixed end for determining the tare and bringing the index again to zero without disturbing its zero position, preparatory to weighing the article or substance, substantially as herein specified.

2. In combination with the suspending arm or lever E and weighing-spring C, the two adjusting-screws *d* and *f*, one for zero and the other for tare, operating to adjust the said lever and spring by means of the lever G and connecting-rod *c*, or their equivalent, substantially as herein specified.

JOSEPH HOLLELY.
JOHN RYER.

Witnesses:
GEORGE W. RYER,
EDWARD RYER.